May 14, 1940.  O. H. SCHUCK  2,200,863
ELECTRICAL CIRCUITS FOR CONTROLLING AND MEASURING
Filed Oct. 3, 1934   10 Sheets-Sheet 1
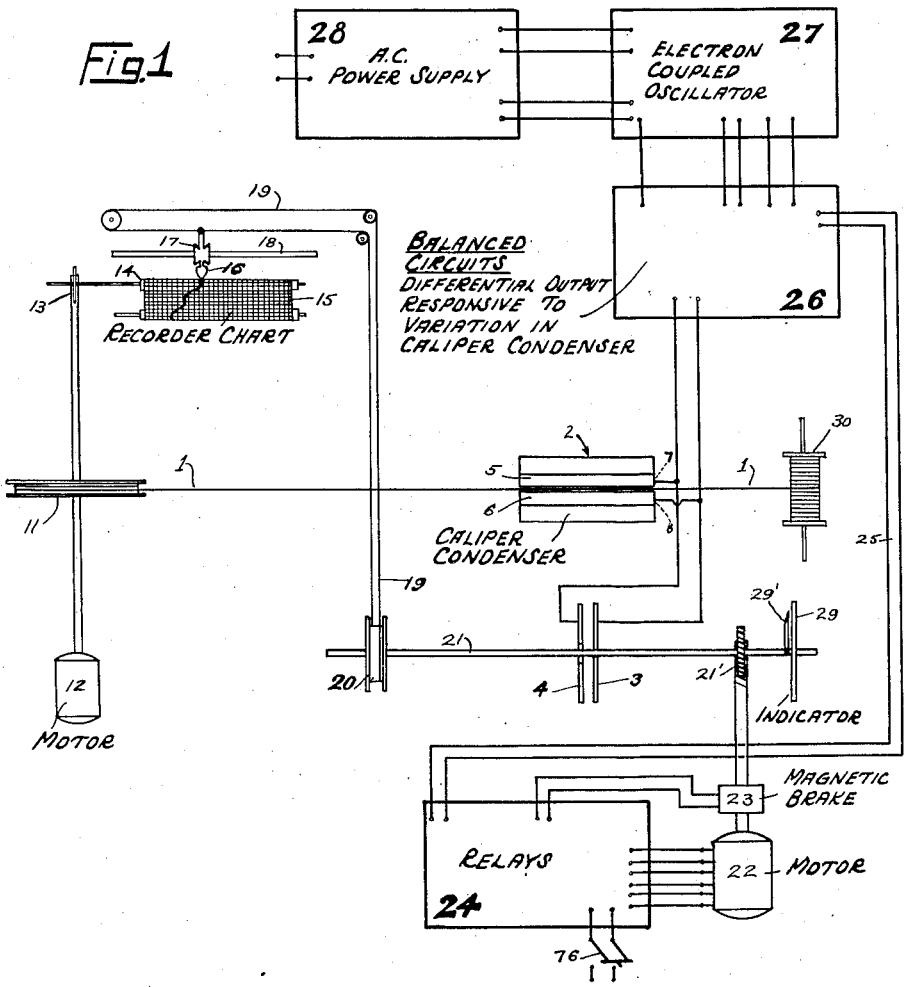
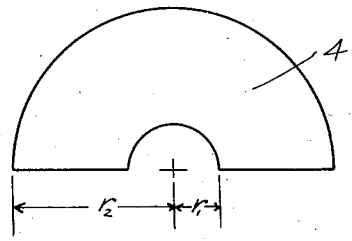
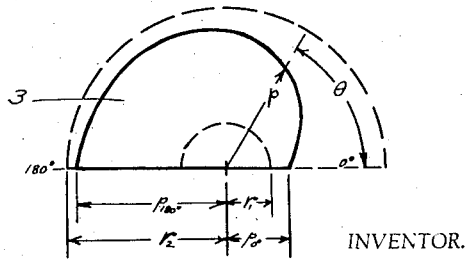
INVENTOR.
OSCAR HUGO SCHUCK
BY
ATTORNEY.

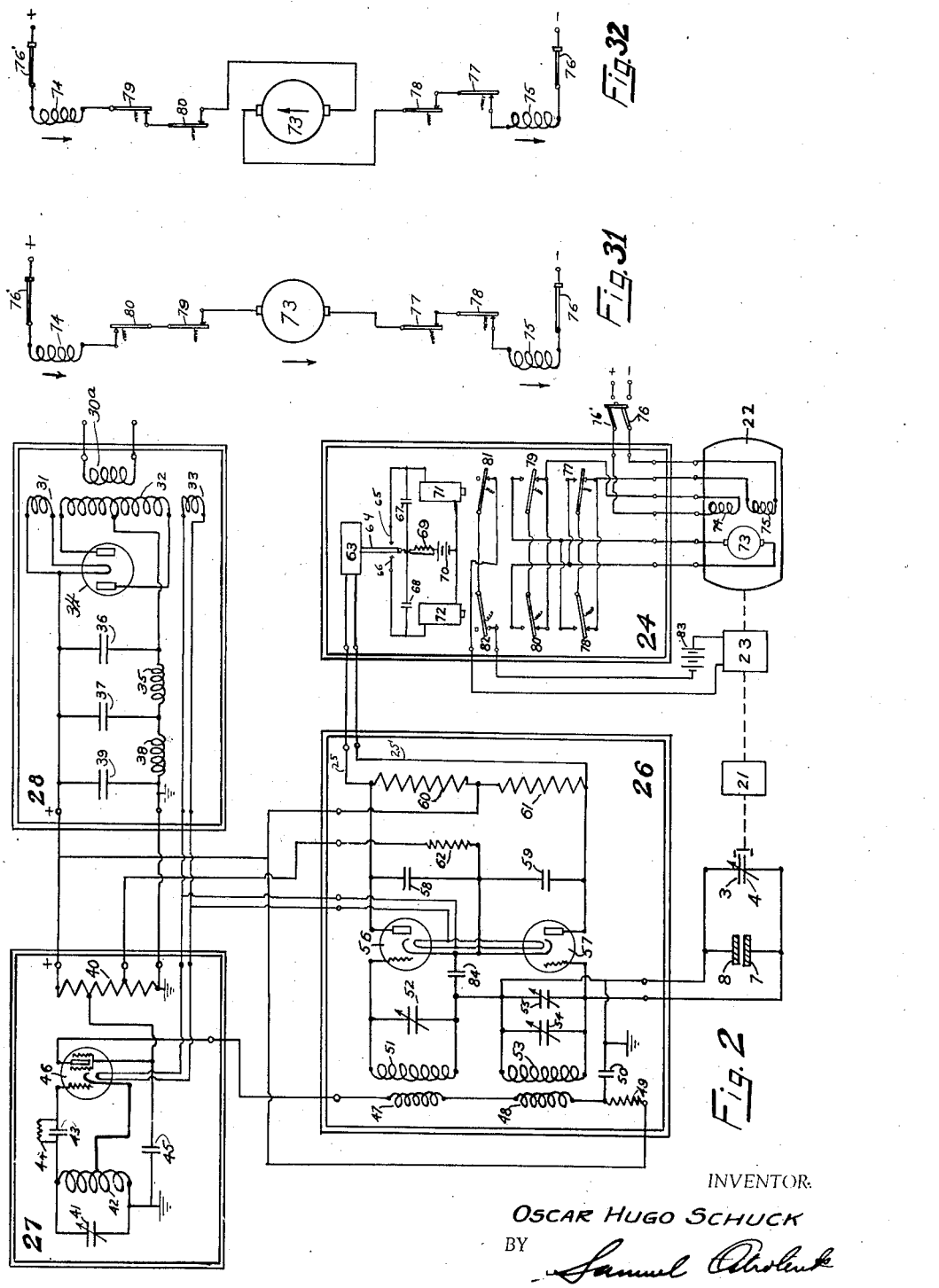

May 14, 1940. O. H. SCHUCK 2,200,863
ELECTRICAL CIRCUITS FOR CONTROLLING AND MEASURING
Filed Oct. 3, 1934 10 Sheets-Sheet 4

INVENTOR.
OSCAR HUGO SCHUCK
BY
ATTORNEY.

May 14, 1940.  O. H. SCHUCK  2,200,863
ELECTRICAL CIRCUITS FOR CONTROLLING AND MEASURING
Filed Oct. 3, 1934  10 Sheets-Sheet 5
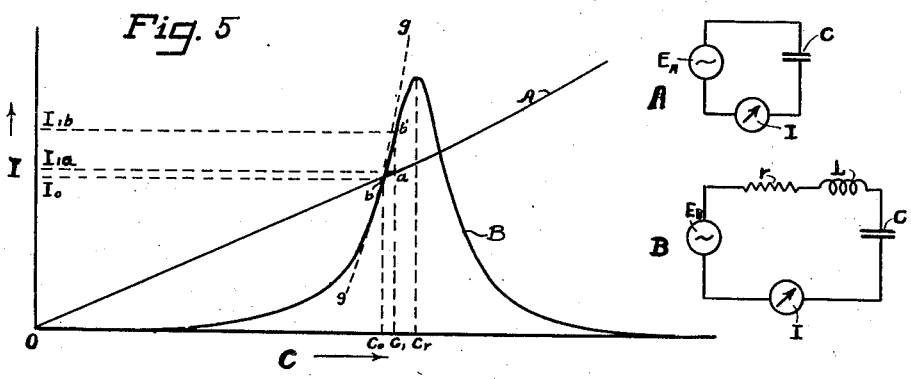
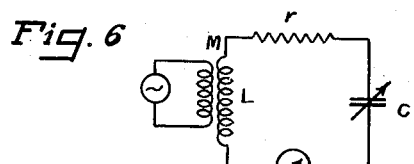
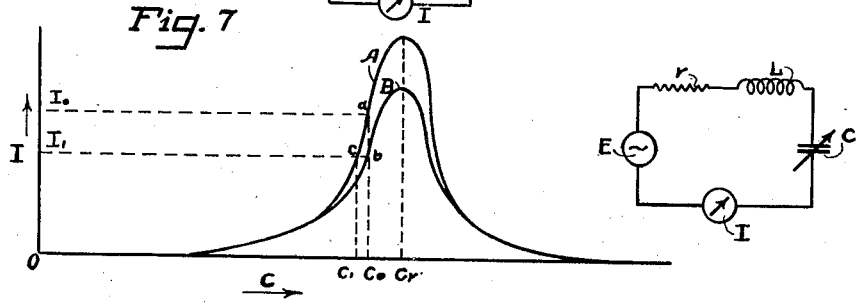
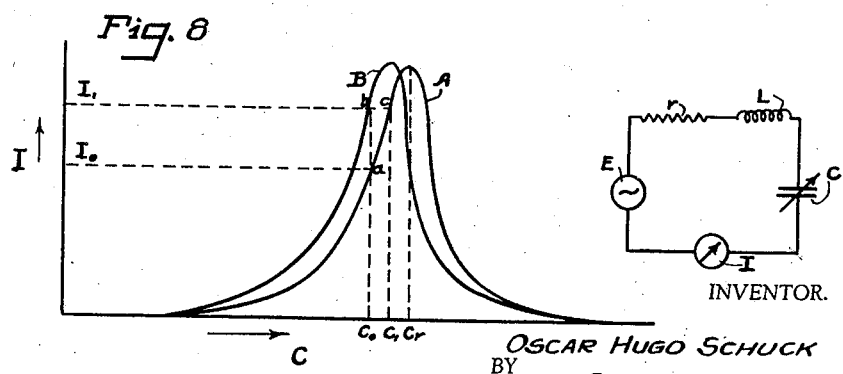
INVENTOR.
OSCAR HUGO SCHUCK
BY
ATTORNEY.

May 14, 1940. O. H. SCHUCK 2,200,863
ELECTRICAL CIRCUITS FOR CONTROLLING AND MEASURING
Filed Oct. 3, 1934 10 Sheets-Sheet 6
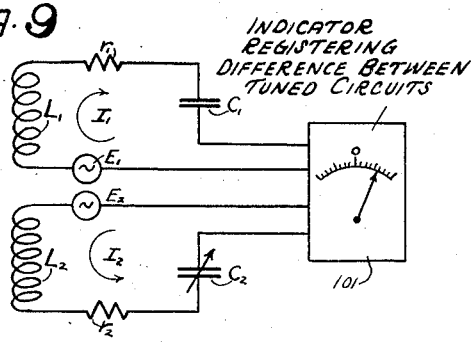
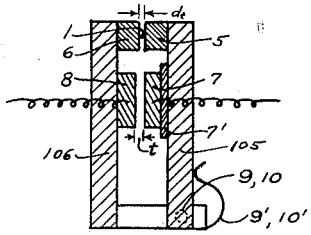
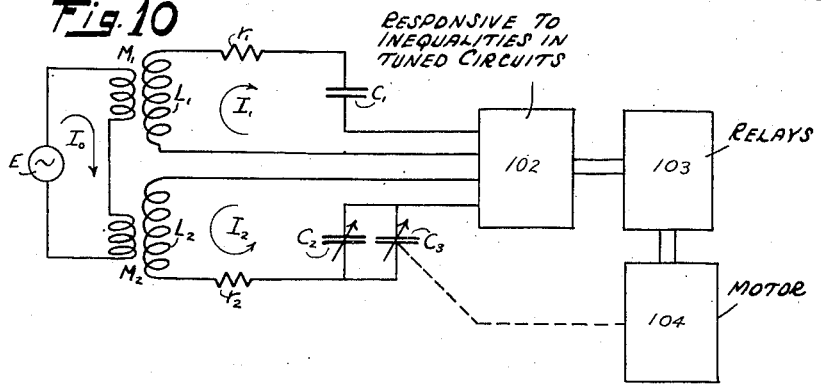
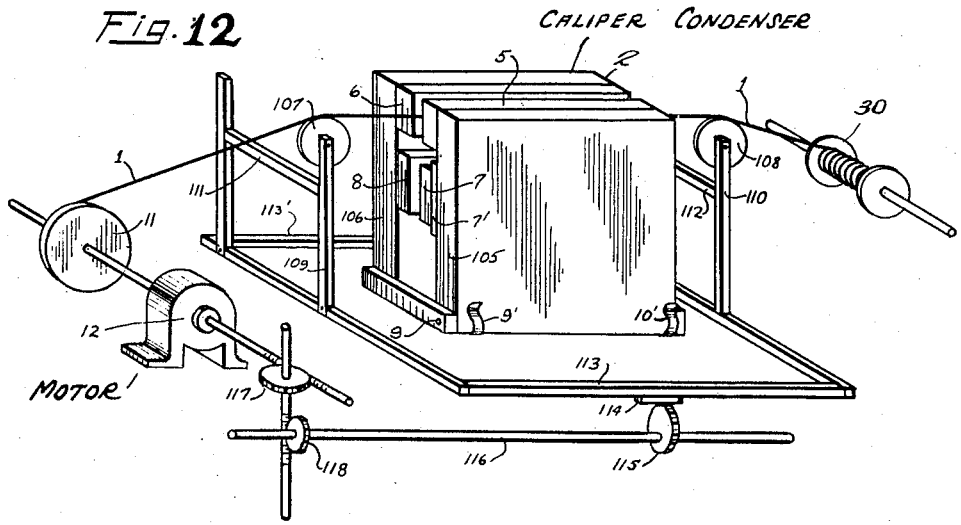
INVENTOR.
OSCAR HUGO SCHUCK
BY
ATTORNEY.

May 14, 1940.    O. H. SCHUCK    2,200,863
ELECTRICAL CIRCUITS FOR CONTROLLING AND MEASURING
Filed Oct. 3, 1934    10 Sheets-Sheet 7
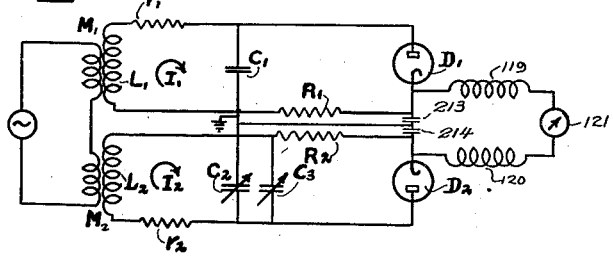
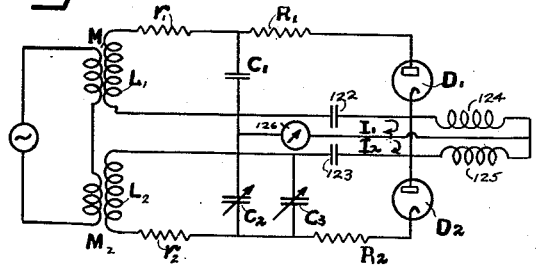
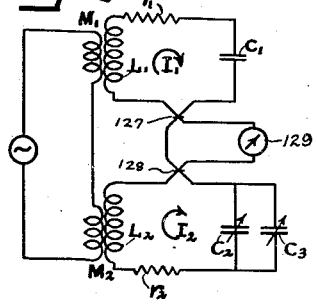
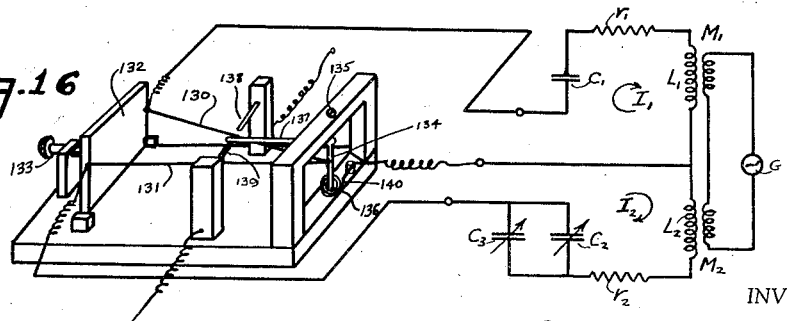
INVENTOR.
OSCAR HUGO SCHUCK
BY
ATTORNEY.

May 14, 1940.  O. H. SCHUCK  2,200,863
ELECTRICAL CIRCUITS FOR CONTROLLING AND MEASURING
Filed Oct. 3, 1934  10 Sheets-Sheet 8
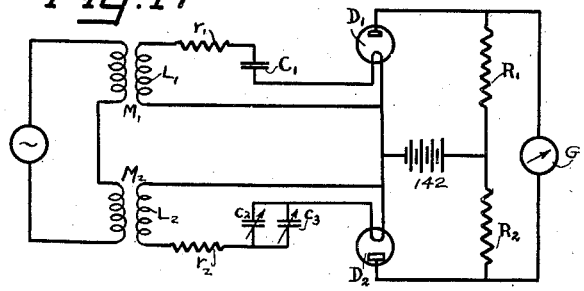
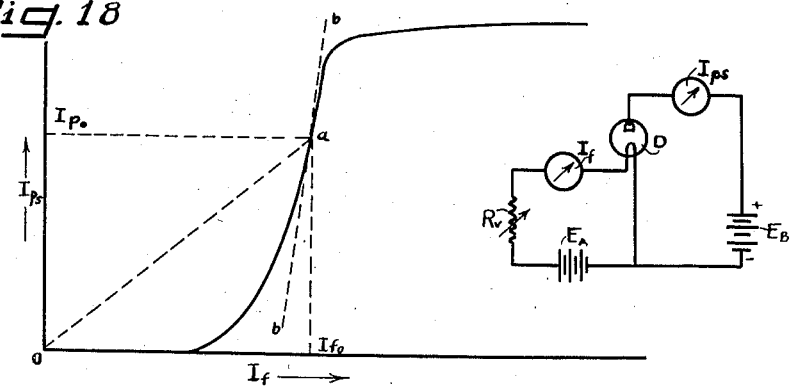
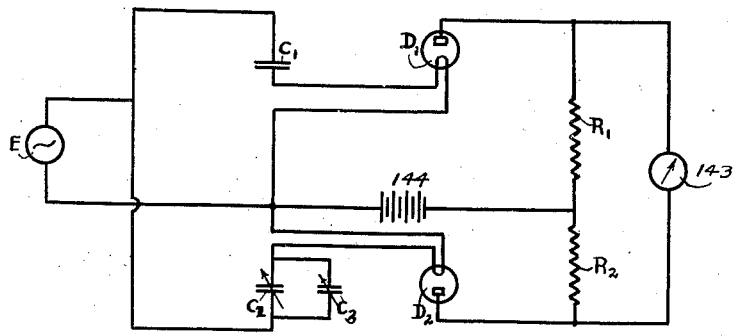
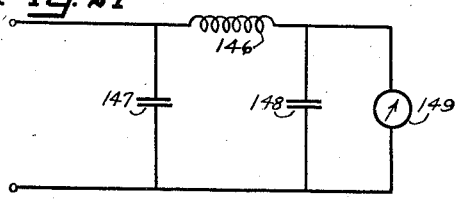
INVENTOR.
OSCAR HUGO SCHUCK
BY
ATTORNEY.

INVENTOR.
OSCAR HUGO SCHUCK
BY
ATTORNEY.

May 14, 1940.  O. H. SCHUCK  2,200,863
ELECTRICAL CIRCUITS FOR CONTROLLING AND MEASURING
Filed Oct. 3, 1934   10 Sheets-Sheet 10

INVENTOR.
OSCAR HUGO SCHUCK
BY
ATTORNEY.

Patented May 14, 1940

2,200,863

UNITED STATES PATENT OFFICE 2,200,863

ELECTRICAL CIRCUITS FOR CONTROLLING AND MEASURING

Oscar Hugo Schuck, Philadelphia, Pa., assignor, by mesne assignments, to Radio Patents Corporation, New York, N. Y., a corporation of New York Application October 3, 1934, Serial No. 746,756

2 Claims. (Cl. 177—351)

My invention relates to novel apparatus for and methods of making measurements of threads, sheets and like materials, and more specifically it relates to and has an object to provide novel sensitive and stable means for and methods of measuring the thickness of threads and sheets which are either stationary or continuously moving from the recording of the thickness, and for the controlling of machinery in accordance with the thickness.

The devices to be described are also applicable to the continuous measurement of dielectric constant, permeability, opacity, and any other properties of materials that may be made to control the values of electrical parameters. One particular application of the invention is to a device for obtaining a continuous measurement of the diameter of silk thread.

The measurement of silk thread and the rating of the thread as to quality are beset with many difficulties, and the standard methods are tedious, wasteful of thread, and inaccurate. Since the thread has the characteristics of a loosely twisted rope, it is not truly round at any point in its length. Moreover, its diameter shows variations from the average diameter within a few inches of length. These short length variations are unimportant and must not be allowed to affect the measurement of the average diameter. At the present time, the most accurate methods involve weighing samples of the thread whose lengths are known, and deducing the diameter from the weight. Since the uniformity of diameter of the thread influences the appearance and strength of the fabric woven or knitted from it, this property of the thread is of the utmost importance.

The particular application of my invention to a device for continuously measuring the diameter of silk thread may be adapted to perform any one or a number of the following tasks: a continuous record of the diameter of the thread may be made, a record of the separately integrated positive and negative deviations from any predetermined diameter may be made, either integrating the deviations themselves or integrating any desired function of the deviations; characteristics of the fabric such as the loop length of stocking fabric may be controlled; and the winding of the thread may be stopped when the diameter of the thread falls outside predetermined limits.

In general my invention contemplates a detection of the variations in thickness of a thread or of a sheet by electrical means and more specifically either by the use of condensers or light responsive devices.

In the former case my invention contemplates the use of a condenser consisting of a pair of plates whose spacing is controlled by the separation of a pair of caliper jaws between which the thread of sheet is passed.

This varying spacing produces a corresponding change in the capacity of the condenser which in turn produces variations in a physical condition and I measure this varying condition to obtain an indication of the change of the thickness of the thread or sheet or to control, if desired, a knitting machine using the thread in accordance with such variations, or to control the operation of a spindle winding machine.

In a preferred form of my invention I have developed a novel electrical circuit which consists of applying voltage at a predetermined frequency to two tuned circuits. The first of these tuned circuits includes among its tuning elements a caliper condenser whose capacity is controlled by the thickness of the thread. The tuning of this circuit, therefore, varies in accordance with the variations in thickness of the thread. Means are provided whereby when the tuning of this first circuit varies, a differential current with respect to the second tuned circuit is produced which operates motor means to vary a second condenser in the first tuned circuit to restore its tuning to the same value as the second tuned circuit.

In short, I employ the null method of comparison in a novel electrical circuit for detecting variations in capacity of the caliper condenser.

In a further adaptation of my invention I employ the principle of light detection mentioned above, in which a source of light is applied to two photoelectric cells. The thread whose thickness is to be measured is passed between the light source and the first of the photocells. Normally a balanced condition is obtained in the output circuit of these photocells. When the thickness of the thread varies from a predetermined value, the amount of light impinging on the first photoelectric cell is changed. This unbalances the electrically balanced condition and operates motor means which control the amount of light impinged on the first photocell to compensate for any variations produced by the thread. The two photocells, therefore, again produce a balanced electrical circuit, and a measure of the unbalance is obtained.

Accordingly an object of my invention is to provide novel apparatus for and methods of measuring the thickness of a thread.

A further object is to provide a novel null method electrical circuit for measuring the variations in electrical conditions.

Still another object is to provide a novel null method for measuring variations in capacity of a condenser.

Still a further object is to apply this novel electrical null method to the detection of variations in the thickness of a thread.

Still a further object is to provide a novel method of employing balanced circuits for measuring variations of capacity which measurements are independent of induced voltage variations and of frequency variations.

A further object is to provide a novel method of measuring variations in capacity of a condenser by utilizing the steep portion of the resonance curve of a tuned circuit across which this condenser is connected where small variations of the capacity produce correspondingly large changes in current.

A further object is to provide a novel method of measuring variations in capacity of a condenser by applying a voltage to a tuned circuit including the condenser, of a frequency different than the resonant frequency of the tuned circuit.

Still another object is to provide novel apparatus for and methods of continuously recording variations in thickness of a thread.

It has been desirable to provide some means for classifying lots of silk thread in accordance with predetermined qualities such, for example, as the uniformity of the thickness of the thread on the spool. Heretofore only crude methods have been possible, such as the weighing of a number of lengths of thread and making comparisons in that manner. However, it will be obvious that this at best provides only a crude and inaccurate measure of the quality of the thread.

In accordance with another aspect of my invention, I contemplate integrating on measuring instruments the variations in the thickness of the thread from a predetermined value so that after the run of a spool of thread, an exact indication is provided of the degree of uniformity of the thickness of the thread on that spool.

Accordingly, a further object of my invention is to provide novel apparatus for and methods of integrating the varying thickness of a thread from a predetermined value.

While my invention may be applied to the continuous measurement of many materials and may also be applied to other uses, the principles involved will most readily be explained by discussing its application to a device for measuring the diameter of a thread.

There are other objects of my invention which together with the foregoing will appear in the detailed description which is to follow in connection with the drawings in which:

Figure 1 is a thread measuring device arranged to make a continuous record of the diameter of the thread;

Figure 2 shows the electrical circuits of a device for measuring the diameter of thread;

Figure 5 is a diagram to illustrate amplification of the effect of capacitance change by use of resonance effects;

Figure 6 is a simple form of measuring device utilizing resonance effects;

Figure 7 is a diagram to illustrate the effect of supply voltage variation on the indications of a measuring device;

Figure 8 is a diagram to illustrate the effect of frequency variation on the indication of a measuring device;

Figure 9 shows the electrical circuits of a measuring device employing balanced circuits giving indications dependent upon the amount of unbalance;

Figure 10 shows the electrical circuits and arrangement of a measuring device employing balanced circuits and using a null method of comparison, giving indications dependent upon the amount of compensating capacitance;

Figure 11 is a cross section of the condenser caliper used in measuring the diameter of the thread;

Figure 12 is an arrangement for automatically moving the running thread over the faces of the caliper plates to decrease the inaccuracies due to their wearing;

Figure 13 shows the electrical circuits for indicating unequality of the currents in the balanced circuit; utilizing diode rectifiers in a bridge arrangement;

Figure 14 shows the electrical circuits for indicating inequality of the currents in the balanced circuit, utilizing diode rectifiers in a mesh circuit;

Figure 15 shows the electrical circuits for indicating inequality of the currents in the balanced circuit, utilizing thermocouples;

Figure 16 shows an arrangement for indicating and operating auxiliary circuits dependent upon unequality of the currents in the balanced circuits, utilizing a differential hot wire ammeter relay;

Figure 17 shows the electrical circuits for indicating inequality of the currents in the balanced circuit, utilizing diodes in resonance circuits;

Figure 18 is a diagram illustrating the dependence of saturation plate current upon the heater element current;

Figure 19 shows the electrical circuits for indicating inequality of the current in a balanced circuit; utilizing diodes in an untuned circuit;

Figure 21 is an electrical circuit for dampening the effect of rapid fluctuations upon the sensitive relay;

Figure 3:
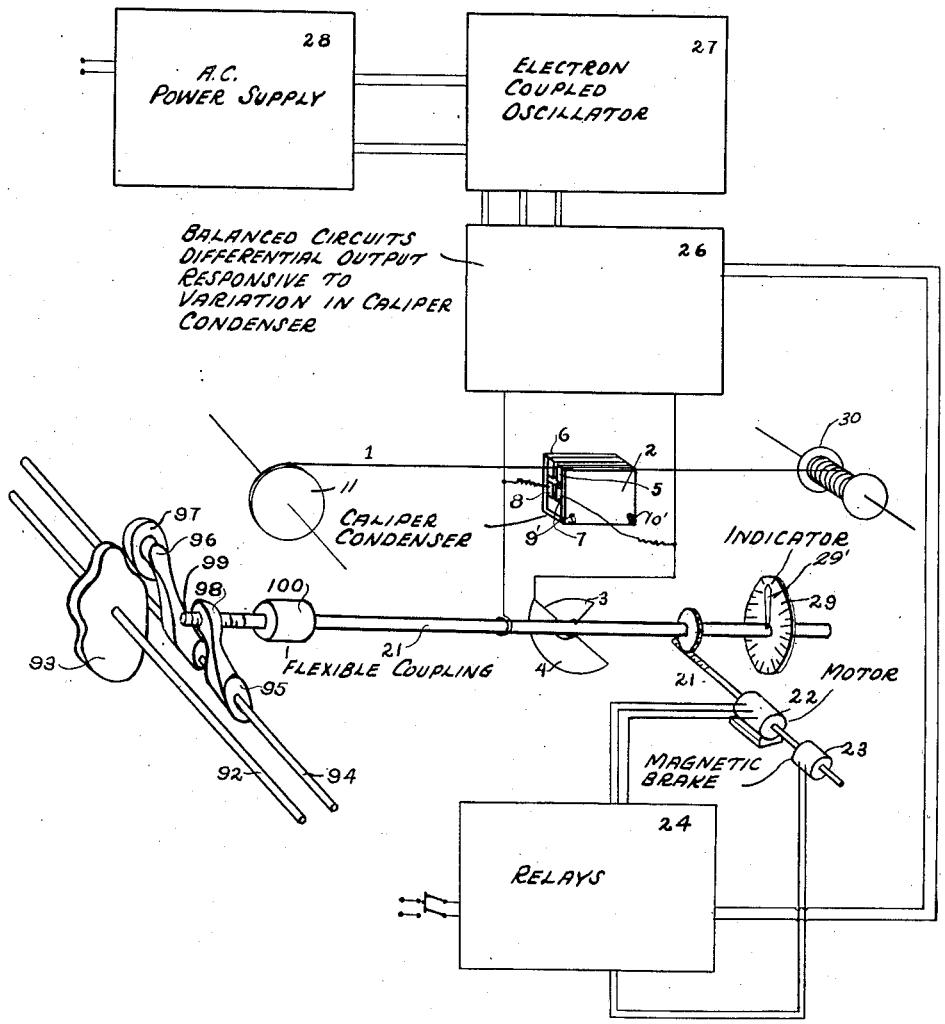
Figure 3 is a schematic showing of thread measuring device arranged to control the loop length regulator on a knitting machine.

Figures 29 and 30 are diagrams used in the design of the compensating condenser plates; and Figures 31 and 32 are schematic views showing the series circuit arrangements that the relay 24 makes in motor 22.

The application of my invention to a device for the continuous measurement of the diameter of a thread as it is passing through the device will be described with various modifications of the several parts and arrangements of the device for performing certain tasks as controlled by the diameter of the thread.

Referring to Figure 1, a thread 1 is shown being reeled from spool 30 on to reel 11, and passing through the caliper 2, the spacing of whose jaws 5 and 6 by the diameter of the thread controls the spacing of the condenser plates 7 and 8 through the lever system pivoted at 9 and 10. This caliper condenser is shown in more detail in Figure 11.

Electrically in parallel with the caliper condenser is a rotating plate compensating condenser with stationary plate 4 and moving plate 3 which is attached to shaft 21. As will be described in detail hereinafter, the angular rotation of plate 3 is a function of the thickness of the thread passing between jaws 5 and 6. Two measuring indications thereof are provided, one at indicator 29, the other a record on the sheet 15. These, briefly, are operated as follows:

Motor 22, whose operation and direction of rotation are controlled by a system of relays 24 in accordance with the capacity variations of condenser 7, 8, as will be described hereinafter, is coupled to shaft 21 through a speed reduction gearing 21'. On the motor shaft is a magnetic brake 23 also controlled by the system of relays 24. A pointer 29', fastened to shaft 21, serves to indicate on a scale 29 the position of the compensating condenser movable plate 3, and a pulley 20 on the same shaft serves to move the pen carrier 17, carrying the pen 16 of a recorder, over the guide 18 through the belting 19 so that the transverse position of the pen on the chart is likewise directly dependent upon the position of the movable plate 3. The reel 11 is driven by motor 12, which also drives the recorder drum 14 through the reduction gearing 13. There is thus a constant relationship between the amount wound on the reel 11 and longitudinal distance on the recorder chart 15.

Electrical circuits contained in 26, 27, 28 are arranged to operate the motor 22 through the system of relays 24 to turn the movable plate 3 so as to keep constant at a predetermined value, the total capacitance of the parallel condensers 7, 8 and 3, 4. If the diameter of the running thread increases, the spacing of the parallel caliper condenser plates 7, 8 is increased. Since for a parallel plate condenser the capacitance is given by $$C = \frac{KA}{4\pi t}$$

where K is a constant depending upon the units and dielectric used, A is the effective area of the plates, and $t$ is the spacing of the plates, increasing said spacing will lower the capacitance.

This decrease in total capacitance is detected by the electrical circuits in 26 in a manner to be described, and operates the motor 22 through the system of relays 24 in such a direction that rotor plate 3 enmeshes with stationary plate 4, increasing the effective area between them and therefore increasing the capacitance of condenser 3, 4 until the total capacitance is again equal to its predetermined value, at which time the motor is caused to stop.

The position of plate 3 of compensating condenser 3, 4 is thus dependent upon the spacing of caliper condenser plates 7 and 8 and thus upon the spacing of the caliper jaws 5 and 6 as determined by the diameter of the thread. Scale 29, over which pointer 29' attached to shaft 21 moves, may therefore be calibrated in terms of the spacing of the caliper jaws, that is, in terms of the thickness of the thread. Since a slight pressure of the caliper jaws upon the thread is caused by the pressure of springs 9' and 10' in order to maintain contact of the jaws with the thread, a slight squeezing of the thread will occur, resulting in an indication of the diameter that is slightly low. In order to minimize this effect, the caliper jaws are made to have a considerable length in contact with the thread, both in order to reduce the unit pressure and also to allow a large number of twists of the thread to be included within the jaws, so as to avoid any untwisting effect.

The transverse position of pen 16 on the paper 15 is controlled by the position of the compensating condenser plate 3, and is therefore dependent upon the thickness of the thread. As the distance the paper moves under the pen is a linear function of the length of thread reeled on to reel 11, the pen 16 traces on the paper 15 a curve of function of thickness against length of thread. What this function of thickness is, is determined by the spacing of the caliper condenser plates and by the shape of the compensating condenser plates.

The capacity of the caliper condenser $$C_2 = \frac{KA_2}{4\pi t} \quad \quad (1)$$

where:

K is a constant depending upon the units used and the dielectric $A_2$ is the effective area of the caliper condenser plates 7 or 8

$t$ is the spacing of these plates

This capacitance $C_2$ is not a linear function of the spacing $t$, but is inversely proportional thereto. We may shape the rotor plate 3 of the compensating condenser 3, 4 to produce any desired variation of the compensating capacitance $C_3$ with angular rotation of said rotor plate. I shall proceed to indicate the design of such compensating condenser 3, 4 to produce an angular variation which is linear with the variations in the thread thickness.

Figure 29 shows the stationary plate 4, made semi-circular in form, with an outer radius of $r_2$ and an inner or cut-off radius of $r_1$.

Figure 30 shows a shape of rotor plate 3 where:

$p$ is the variable radius of rotor plate 3

$\theta$ is the angle in degrees of insertion of rotor plate with respect to the 0° position $p_0$ is its radius at 0° or zero insertion $p_{180}$ is its radius at 180° or full insertion The outer radius $r_2$ of stationary plate 4 is made larger than the largest radius of plate 3.

The effective area $A_3$ between the plates 3 and 4 when they mesh θ degrees is derived by:

$$A_3 = \int_0^\theta \tfrac{1}{2} p^2 d\theta - \int_0^\theta \tfrac{1}{2} r_1^2 d\theta$$

or $$A_3 = \int_0^\theta \tfrac{1}{2}(p^2 - r_1^2) d\theta \quad \text{(2)}$$

If $s$ is the spacing of plates 3 and 4, and K is the same as for $C_2$, then the capacitance $C_3$ of the compensating condenser 3, 4 for any insertion θ is:

$$C_3 = \frac{KA_3}{4\pi s} = \frac{K}{8\pi s}\int_0^\theta (p^2 - r_1^2) d\theta \quad \text{(3)}$$

At any compensated or balanced position, the sum of $C_2$ and $C_3$ is necessarily a constant value, say equal to $C_0$, hence:

$$C_2 + C_3 = C_0 \quad \text{(4)}$$

Setting:

$d_t$ = varying thread diameter
$d_1$ = minimum thread diameter to be measured
$d_2$ = maximum thread diameter to be measured
$t$ = spacing of plates of caliper condenser $C_2$
$t_0$ = minimum spacing of plates of caliper condenser $C_2$ (when caliper jaws 5 and 6 touch)
$k$ = a constant Then:

$$t = t_0 + d_t \text{ (substantially so)} \quad \text{(5)}$$

Let:
$d_t = d_1 + k\Theta$
$d_t = d_1$ when $\Theta = 0°$ or out of mesh
$d_t = d_2$ when $\Theta = 180°$ or fully in mesh Then:

$$d_2 = d_1 + k \cdot 180° \quad \text{(6)}$$

And:

$$k = \frac{d_2 - d_1}{180°}$$

From (5):

$$t = t_0 + d_1 + k\Theta \quad \text{(7)}$$

and:

$$t = t_0 + d_1 + \frac{(d_2 - d_1)\theta}{180°} \quad \text{(8)}$$

Differentiating (7) with respect to $\theta$, we have:

$$d_t = k d\Theta \quad \text{(9)}$$

Differentiating (4):

$$\frac{dC_2}{dt} + \frac{dC_3}{dt} = 0 \quad \text{(10)}$$

Or:

$$\frac{dC_2}{dt} = -\frac{dC_3}{dt} \quad \text{(11)}$$

But, differentiating $C_2$ (1):

$$\frac{dC_2}{dt} = -\frac{KA_2}{4\pi t^2} \quad \text{(12)}$$

And, differentiating $C_3$ in (3) and using (9):

$$\frac{dC_3}{dt} = \frac{dC_3}{k d\theta} = \frac{1}{k} \cdot \frac{K}{8\pi s}(p^2 - r_1^2) \quad \text{(13)}$$

From (11), (12) and (13):

$$\frac{KA_2}{4\pi t^2} = \frac{1}{k} \cdot \frac{K}{8\pi s}(p^2 - r_1^2) \quad \text{(14)}$$

Or:

$$p^2 = r_1^2 + \frac{2A_2 k s}{t^2} \quad \text{(15)}$$

And by (7) and (8):

$$p^2 = r_1^2 + \frac{2A_2 s (d_2 - d_1)}{180°\left[t_0 + d_1 + \frac{(d_2-d_1)\theta}{180°}\right]^2} \quad \text{(16)}$$

The radius $p$ is determined by the expression (16) which is a function of $\theta$. The shape of rotor plate 3 is described to give linear indications on the scale, proportional to the variations in thread thickness.

If a scale is desired so that linear indications on the scale are proportional to the percentage variations in the diameter of thread, then a logarithmic design of the rotor plate 3 is necessary. The equation of the desired indication is:

$$\log_E d_t = G\theta + H \quad \text{(17)}$$

where E is the natural logarithm base equal to 2.71828+, and where G and H are arbitrary constants. To find their value with the conditions:

$d_t = d_1$, when $\theta = 0°$
$d_t = d_2$, when $\theta = 180°$

Then:

$$\log_E d_1 = H \quad \text{(18)}$$

And:

$$\log_E d_2 = 180° \; G + H = 180° \; G + \log_E d_1$$

Or:

$$G = \frac{1}{180°} \cdot \log_E \frac{d_2}{d_1} \quad \text{(19)}$$

Hence:

$$\log_E d_t = \frac{\theta}{180°} \log_E \frac{d_2}{d_1} + \log_E d_1$$

Or:

$$d_t = \left[\frac{d_2}{d_1}\right]^{\frac{\theta}{180°}} \cdot d_1 \quad \text{(20)}$$

Differentiating (17):

$$\frac{d(d_t)}{d_t} = G d\theta, \text{ or: } d(d_t) = d_t \cdot G \cdot d\theta \quad \text{(21)}$$

Differentiating (5):

$$dt = d(d_t) \quad \text{(22)}$$

From (21) and (22):

$$dt = d_t \cdot G \cdot d\theta \quad \text{(23)}$$

Differentiating (3), and from (23):

$$\frac{dC_3}{dt} = \frac{1}{d_t \cdot G} \cdot \frac{dC_3}{d\theta} = \frac{K(p^2 - r_1^2)}{8\pi s G d_t} \quad \text{(24)}$$

From (11), (12) and (24):

$$\frac{KA_2}{4\pi t^2} = \frac{K(p^2 - r_1^2)}{8\pi s G d_t} \quad \text{(25)}$$

Or:

$$p^2 = r_1^2 + \frac{2A_2 s G d_t}{t^2} \quad \text{(26)}$$

Substituting (5), (19), (20) in (26):

$$p^2 = r_1^2 + \frac{2A_2 s \log_E \frac{d_2}{d_1}\left[d_1\left(\frac{d_2}{d_1}\right)^{\theta/180°}\right]}{180°\left[t_0 + d_1\left(\frac{d_2}{d_1}\right)^{\theta/180°}\right]^2} \quad \text{(27)}$$

The shape of logarithmic rotor plate 3 is determined by the radius $p$ as a function of $\theta$ in expression (27). The shape of the stationary plate 4 is the same as indicated in Figure 29.

It is not essential that the compensating condenser 3, 4 be of the form shown in Figures 29 and 30. Any other form of condenser in which the capacitance is a function of a mechanical displacement may be used. Furthermore, it is also possible to substitute for the condenser caliper any other device in which the thickness of the thread will control the current in an electrical circuit, and for the compensating condenser any other device whereby the current may be kept constant by automatic compensating means involving a mechanical or electrical displacement which may be arranged to operate indicating or controlling means. Likewise the form of the indicating and recording means shown in Figure 1 are only to be taken as being illustrative of means for accomplishing the desired purposes.

Figure 11 shows the cross section of a practical condenser caliper for the measurement of thread diameter. Parallel caliper jaws 5 and 6 are mounted on plates 105 and 106 hinged on jewelled bearings at 9 and 10 and kept in contact with the thread 1 by springs 9' and 10'. Reference may also be had to Figure 12 in which the symbols are the same. Condenser plates 7 and 8 are fastened to the plates 105 and 106, plate 7 being insulated from 105 by insulation 7'. The spacing of the caliper condenser $C_2$ plates $t$ is controlled by the spacing of the caliper jaws as determined by the diameter of the thread $d_t$. In order to reduce the rapid capacitance variation of $C_2$ when plates 7 and 8 are close, due to the non-linearity of this capacitance variation with diameter of the thread by the reciprocal relation $$C_2 = \frac{KA_2}{4\pi t}$$

the condenser plates 7 and 8 are so arranged that they have the initial separation $t_o$ when the caliper jaws 5 and 6 are touching.

In spite of the fact that thread is usually not considered hard or abrasive, its continual passage through the caliper jaws will wear them, thus changing the calibration. In order to minimize the wear, arrangement may be made to continually change the position of the thread within the parallel jaws. In Figure 12 is shown such an arrangement, the position of travel of the thread through the caliper jaws being controlled by the position of guide pulleys 107 and 108 carried on parallel linkages 109, 111 and 113, and 110, 112 and 113', respectively. The two pulleys are simultaneously moved up and down through the linkages by the plate 114 attached to 113 and bearing on rotating cam 115. Cam 115 is geared through shaft 116 and speed reduction gearing 117 and 118 to the motor 12 which drives the winding-up reel 11, and thus the position of the thread is continually caused to change as it runs through the caliper jaws.

One form that the electrical circuit 26, 27, 28 and the system of relays 24 of Figure 1 may take is shown in Figure 2. A conventional alternating current power supply device for furnishing direct and alternating currents of the proper voltages for operating the vacuum tubes in other parts of the apparatus is indicated at 28. It comprises a transformer having primary 30a and secondary windings 31, 32 and 33, a thermionic rectifier 34, and a filter system of inductors 35 and 38 and condensers 36, 37 and 39.

A vacuum tube oscillator is contained in 27, comprising a capacitance 41 and an inductance 42 forming the oscillatory circuit, grid condenser 43 and grid leak 44, and by-pass condenser 45 for the screen grid of the tetrode 46, in a circuit well known to the art as an electron-coupled oscillator. A voltage divider 40 serves to furnish the proper voltages for the operation of the oscillator tube and for the vacuum tubes in the device 26, now to be described.

Included in 26 are two tuned circuits, one consisting of inductor 51 and variable condenser 52, the other of inductor 53 and variable condensers 54, 55, in parallel with caliper condenser 7, 8 and compensating condenser 3, 4. Inductors 51 and 53 are substantially identical in inductance and resistance and have no mutual inductance between them. Condenser 52 tunes inductor 51 to a frequency slightly different from the frequency of the oscillations generated by the oscillator in 27. Inductor 53 is tuned to the same frequency as 51 by the capacitance of the parallel combination of condensers 54, 55, 7, 8 and 3, 4, 54 and 55 being respectively arranged for coarse and fine adjustment. Current of the oscillator 27 frequency flows in coils 47 and 48, arranged in substantially equal inductive relationship respectively, with inductors 51 and 53 and included in the plate circuit of the oscillator 27. A filter consisting of resistor 49 and condenser 50 is included to prevent undesirable coupling with the tubes 56 and 57.

Since the same current flows through coils 47 and 48, and the respective mutual inductances $M_1$ and $M_2$ are equal, equal electromotive forces are induced in inductors 51 and 53, and if the capacitances in the two circuits are equal, equal currents will flow in the two tuned circuits. Equal currents flowing in the two circuits will produce equal voltages across the two inductors 51 and 53. 56 and 57 are two substantially identical vacuum tubes whose grids are biased approximately at plate current cut-off by connecting the cathodes through the filter consisting of resistor 62 and condenser 84 to an appropriate point on the voltage divider 40. Plate by-pass condensers 58 and 59 by-pass the alternating component of the plate current of each tube, which flows when the grid-cathode circuits are respectively connected across the inductors 51 and 53, as shown in the figure. When the alternating voltages applied to the grids are equal, equal currents will flow, and the voltage drops across the two substantially equal plate load resistors 60 and 61 will be equal. The two plates will now be at the same potential and no current will flow through the relay coil 63 connected through the leads 25, 25' across the two plates.

If the frequency of the current supplied by the oscillator to the two tuned circuits is lower than the frequency to which they are tuned, the current in each of the circuits will be less than its maximum resonance value. If now the capacitance of caliper condenser 7, 8 is increased by a decrease in the diameter of the thread running through it, inductor 53 will be tuned more nearly to resonance with the frequency of the oscillator, and the current through it and the voltage across it will increase, resulting in an increase of the plate current of vacuum tube 57.

This well known effect is illustrated in Figure 5, in which the curve B of current through the inductor of a tuned circuit as a function of the capacitance is plotted. If the initial capacitance is $C_0$ and it is increased to $C_1$, the current is increased from $I_0$ to $I_{1b}$. When the current through the inductor 53 increases, the voltage across it increases, resulting in a larger voltage drop across plate resistor 61. The plate of 57 is then at a lower voltage than the plate of 56, current will flow through the relay coil 63 and the system of relays 24 will operate the motor 22 to decrease the capacitance of compensating condenser 3, 4 until the total capacitance across inductor 53 is again equal to that across inductor 51. At this time the plates of 56 and 57 will again be at the same voltage, current will no longer flow through relay coil 63 and the motor will be caused to stop. The action is automatic and will continue for as long a period of time as desired. Any changes in the capacitance of caliper condenser 7, 8 are immediately compensated by motion of the compensating condenser 3, 4.

The vacuum tube circuit in 26 may also be considered as a form of Wheatstone bridge consisting of the two equal arms 60 and 61 and the plate resistances of the two vacuum tubes 56 and 57. The values of the plate resistances are controlled by the alternating voltages across the inductors 51 and 53. The inequality of these voltages results in an inequality between the two plate resistances, unbalancing the bridge and allowing current to flow through the relay coil 63 connected in the position the galvanometer usually occupies in such a bridge circuit.

The system of relays 24 controlling motor 22 consists of one sensitive polarized relay of the galvanometer type with coil 63 and armature 64 which moves to touch contact 65 when current flows through the coil in one direction and to touch contact 66 when current flows in the other direction. Condensers 67 and 68 and resistor 69 serve to stop sparking at the contacts. Battery 70 energizes relay coil 71 when contact 65 is touched by armature 64, and energizes relay coil 72 when contact 66 is touched.

I have illustrated a direct current series motor with series field windings 74 and 75 and armature winding 73. Switch 76—76' connects the source of power to the motor 22 through relays in 24. Referring to Figure 31, energizing of relay coil 71 moves armatures 77 and 79 against the force of their respective springs to contact their front contacts, to connect field windings 74 and 75 and armature winding 73 in series. Tracing through the resulting series circuit, the positive power source terminal connects to one arm of switch 76—76', then to field winding 74, then to back contact and armature 80, through armature 79 and its front contact, from there through the armature winding 73, then to front contact and armature 77, to armature 78 and its back contact, through field winding 75, and back to the negative terminal of the power source through a switch arm of 76—76', to complete the circuit. The direction of rotation of the motor 22 is in one predetermined direction.

Energizing of relay coil 72, however, moves the armatures 78 and 80 to their front contacts. This results in a series circuit as illustrated in Figure 32. It is similar to that of Figure 31, except that the direction of current flow through the armature winding 73 is reversed. This position serves to rotate the motor opposite to the predetermined direction.

The contacts on armatures 77, 78, 79 and 80 are so connected to the field and armature windings as to make impossible the short circuiting of the motor armature if one of the relay armatures sticks and does not open when the relay coil controlling it ceases to be energized. This is due to the series relation traced above.

Armatures 81 moved by coil 71, and 82 moved by coil 72, connect potential source 83 to the magnetic brake 23, which functions to stop the motor 22 quickly when either coils 71 or 72 are no longer energized and thus to prevent overshooting. The connections to the relays and motor are so poled that rotation of the compensating condenser 3, 4 by motor 22 is in such a direction as to compensate for changes in the capacitance of the caliper condenser 7, 8 and thus to bring the circuit back to balance as explained before. Motor 22 is geared to condenser plate 3 by the indicated reduction gearing 21.

It will be obvious to those skilled in the art that the several parts shown in Figure 2 are only unique in their function and functional relationship, and that other devices could be substituted for them without in any way departing from the spirit of the invention. For instance, the alternating current supplied power supply device 28 could be replaced by batteries or by generators. The vacuum tube oscillator 27 could be replaced by any other form of vacuum tube oscillator or by some other form of oscillation generator. The constancy of the combined capacitance of the caliper condenser 7, 8 and the compensating condenser 3, 4 could be maintained by other devices than those illustrated in Figure 2. As examples, some other devices for accomplishing the same purposes will later be described.

Figure 3 shows a thread measuring device arranged to control the thread loop length of a knitting machine. If a length of thread sufficient for two or more courses of the knitted fabric is, say, thinner than normal, it will show in the finished fabric as a band of less than normal density, thus seriously impairing the value of the fabric. However, the visual density of the fabric depends upon the loop length as well as upon the thread diameter since a shorter loop length means more thread per unit length of fabric. The decrease in density due to a thin length in the thread can thus be compensated for by decreasing the loop length by an appropriate amount. In one form of knitting machine for the manufacture of full-fashioned silk hosiery, the length of the loop is controlled by the angular position of a roller arm 96 which rotates on the regulating shaft 94 with respect to the arm 95 fastened to the shaft. The roller 97, which is carried by the arm 96, bears on cam 93, fastened to cam-shaft 92, and serves to move the regulating bar to control the needles, etc., through their proper phases in the knitting of a course. Micrometer screw 99, passing through nut 98 in arm 95, bears on arm 96 and serves to provide a very precise adjustment of the length of the loop. Automatic control of the loop length as a function of the thread diameter is achieved by coupling the shaft 21 of the rotating compensating condenser to the micrometer screw 99 through the flexible coupling 100. The shape of the condenser plates in this case is such that the compensation is of the right amount to result in a uniform appearance of the finished fabric.

Most of the stocking knitting machines now in operation are built to knit a number of stockings at a time. The loop length of all of the stockings is simultaneously controlled by the position of the roller arm 96. Without a special provision for the separate regulation of the loop length of each stocking, the loop length compensation described above could not be applied to such multiple machines. It could only be applied to individual machines knitting only one stocking at a time, or to other machines knitting only one piece of fabric at a time. However, an improvement in the appearance of the fabric can be obtained by removing from the thread before knitting any thick or thin lengths. This can be accomplished immediately after the thread has been spun, as it is being wound onto the spools on the spinning machine, or as it is being rewound onto the cones from which it is drawn on the knitting machine.

Figure 4:
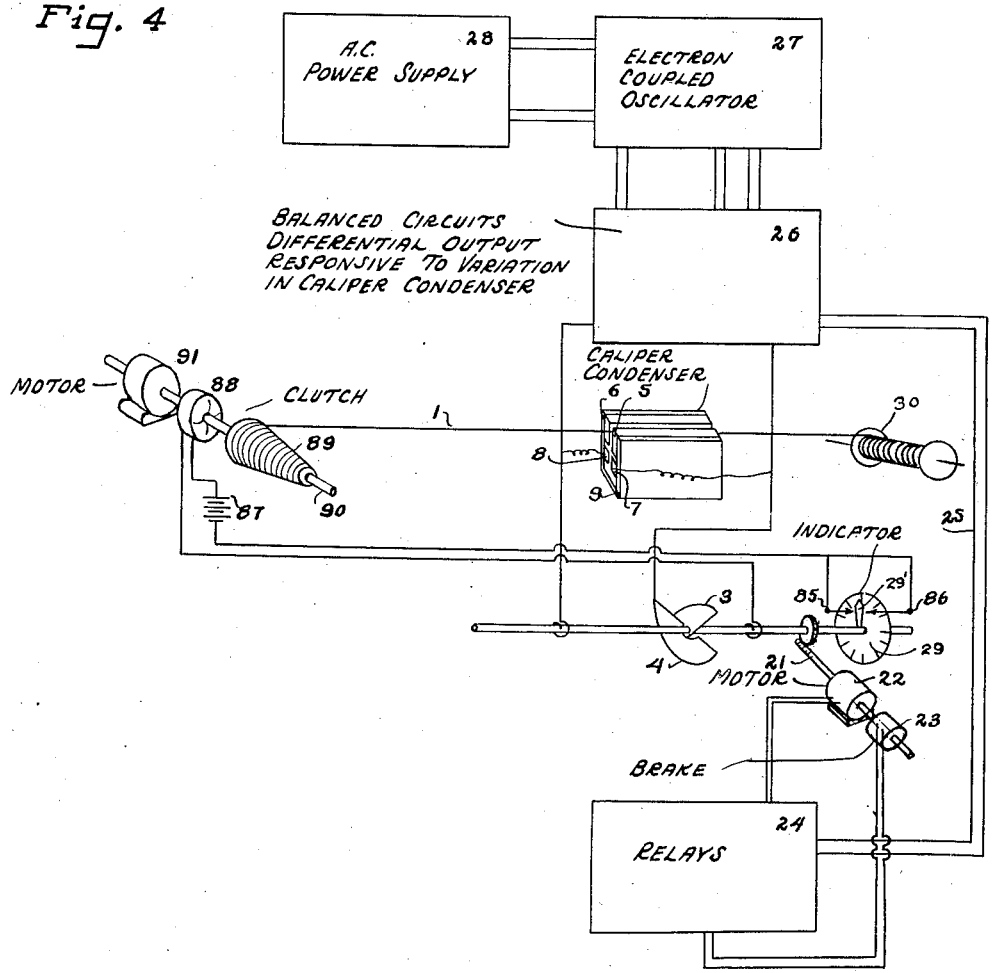
Figure 4 is a schematic showing of a thread measuring device arranged to stop the winding up of the thread when the diameter of the thread falls outside predetermined limits.

Figure 4 illustrates an arrangement for stopping the winding machine spindle 90 carrying the cone 89 onto which the thread is being wound when the diameter of the thread departs from within predetermined upper and lower limits. The scale 29 is here equipped with contacts 85 and 86 which are set so that the pointer 29' touches contact 85 when indicating the desired upper limit of diameter, and contact 86 when indicating the lower limit of diameter. When either contact is touched by the pointer, battery 87 energizes the clutch device 88 to disengage the spindle 90 from the spindle driving motor 91, and thus to stop the rotation of the spindle. The clutch device 88 may take any desired form, and may also be combined with the device normally furnished on winding machines for stopping the spindle when the thread breaks.

In the form of the invention illustrated in Figures 1 to 4, the electrical quantity controlled by the thickness of the thread is the capacitance of a condenser. As before stated, it is the function of the electrical apparatus automatically to move a compensating condenser so that the total capacitance of the caliper condenser and the compensating condenser in parallel is kept constant. It is therefore necessary for accuracy that the electrical circuits be capable of responding to small changes in capacitance, and of being independent of any other variations, such as temperature, humidity, supply voltage fluctuations, or aging of vacuum tubes. It is part of the object of this invention to disclose means for achieving these desiderata of sensitivity and stability. The question of sensitivity will first be considered.

The only convenient method of measuring capacitance, particularly a small capacitance such as, for reasons of convenience of dimensions, is formed by the caliper and compensating condensers, is to measure the alternating current flowing through it or through it in parallel with a larger capacitance of known value. The current through a condenser of capacitance C is $I = E_a 2\pi f C$, where I is the current, $E_a$ the applied voltage, both the effective value of sinusoidal alternating quantities, and $f$ is the frequency of the applied voltage. The current is thus seen to be a linear function of the capacitance. In Figure 5 is illustrated, at A, the circuit for such a measurement of capacitance, and curve A shows the relationship graphically, current being plotted against capacitance, the frequency of the applied voltage being kept constant. The sensitivity of this method for measuring slight changes in capacitance is not very high, since a change in capacitance, say an increase from $C_0$ to $C_1$, will produce only an equal percentage increase in current from $I_0$ to $I_{1a}$. However, if in series with the condenser there is connected an inductor having an inductance such as to tune the circuit almost to resonance with the frequency of the applied voltage, the sensitivity is enormously increased.

The circuit is shown at B in Figure 5, where C is the capacitance, L the inductance and $r$ the total circuit resistance. Curve B shows the well known relation in this case between current and capacitance. The inductance L in this case is too small to tune the capacitance to resonance; it would be necessary to increase the capacitance from $C_0$ to $C_r$ to obtain resonance. The expression for current is $$I = \frac{E_B}{\sqrt{r^2 + \left[2\pi f L - \frac{1}{2\pi f c}\right]^2}}$$

For the sake of convenience on the diagram, the electromotive forces $E_A$ and $E_B$ have been adjusted to give the same current $I_0$ for a capacitance $C_0$. Increasing the capacitance to $C_1$ in circuit B, raises the operating point from b to b' instead of to a, and the current increases from $I_0$ to $I_{1b}$ instead of only to $I_{1a}$, a much greater increase. The sensitivity may be considered to depend upon the change in current for a given small change in capacitance, that is, upon the slope of the curve at the working point. This is the slope of the tangent line g—g. Its slope will be greater, the less the resistance $r$ in the circuit, and it is also affected by the relative values of inductance and capacitance.

It will be recognized by those skilled in the art that this amplification of sensitivity through resonance phenomena is the basis of operation of one form of so-called ultra-micrometer circuit. The circuit for such an ultra-micrometer device is given in Figure 6, in which C is the condenser whose capacitance variation is to be measured, inserted in series with the ammeter I and the inductor L having a resistance $r$, and supplied through the mutual inductance M from an oscillator. Variations in the capacitance of C are observed through the changes in the current indicated by I. This discussion of the conventional ultra-micrometer circuit is included in order to explain more clearly the factors which influence its stability, and to make more clear how in my invention I attain a high degree of stability.

In Figure 7 I show, at A, a curve of current against capacitance of a tuned circuit, such as shown in Figure 6, with a diagram of the circuit to which it applies, namely, an electromotive force E in series with resistance $r$, inductance L and capacitance C. If the capacitance is $C_0$, the current will be $I_0$. Now if the electromotive force E be reduced, as may happen due to decrease in supply voltage to the oscillator, aging of the oscillator tube, etc., the ordinates of curve A will be reduced proportionately to form curve B. The working point on the curve will drop from a to b, and the current will now be $I_1$. This is the same current that would flow if the electromotive force E had remained constant and the working point a had been shifted to c by a decrease in capacitance from $C_0$ to $C_1$, so that a false indication of the value of the capacitance will be obtained.

A similar source of error is that due to change in the frequency of the oscillator. In Figure 8, at A, is again given the curve of current against capacitance, the capacitance for resonance being $C_r$, the initial capacitance being $C_0$, the initial working point a, and the initial current $I_0$. If now the frequency of the oscillator rises slightly, so that it would take a smaller capacitance to tune the circuit to resonance, the current-capacitance curve would be given by B, the working point would be b, and the current $I_1$ would flow. This is the same current that would flow if the frequency had remained constant and the working point had been shifted to c by an increase of capacitance from $C_0$ to $C_1$, so that a false indication of the value of the capacitance will again be obtained.

Both the frequency and voltage may change simultaneously, as can happen if the plate or filament supply voltages to the oscillator change. R. F. Field, in United States Patent 1,813,488, has disclosed an experimentally determined method for causing the effects of the two changes to balance each other over a considerable range of supply voltage variation, for a special form of ultra-micrometer device. While such a compensated circuit could be used in the electrical circuits for keeping the combined capacitance of the caliper and compensating condensers constant, and such use is within the scope of my invention, I prefer to attain stability through the use of balanced circuits.

A simple form of balanced circuit is shown in Figure 9. There are two tuned circuits having no mutual impedance, the first consisting of condenser $C_1$ and inductor $L_1$ having resistance $r_1$; the second consisting of the condenser $C_2$ whose capacitance is to be measured, and the inductor $L_2$ having resistance $r_2$. Equal electromotive forces $E_1$ and $E_2$, supplied from the same source, act in the two branches. $L_1$ and $L_2$ are equal, $r_1$ and $r_2$ are equal, and when $C_2$ is equal to $C_1$, it is seen that equal currents $I_1$ and $I_2$ flow in the two circuits. Device 101 is to measure and indicate the magnitude and the sense of the difference in amplitude between $I_1$ and $I_2$. When $C_2$ is equal to $C_1$, then $I_2$ is equal to $I_1$ and the device 101 will indicate zero. If both circuits are working at point $a$ on the curve A of Figure 8, and $C_2$ is increased slightly so that $I_2$ increases, $I_2$ will be greater that $I_1$ and device 101 will indicate the magnitude of the increase, which will be dependent upon the magnitude of the capacitance increase.

Since the parameters of the two circuits are identical, variations of voltage or frequency will effect both equally, merely changing the operating point on the curve equally for both and not affecting the equality of currents when $C_2$ is equal to $C_1$. However, if the indications of the device 101 are taken to depend upon the difference in capacitance between $C_2$ and $C_1$, the calibration will change as the operating point moves along the curve, due to the varying slope of the curve. For this reason I prefer to use a null method of comparison, keeping the circuits always balanced by use of a compensating condenser, and taking the setting of the compensating condenser as a measure of the difference in capacitance between $C_2$ and $C_1$. Change in slope of the resonance curve with change of the operating point due to voltage or frequency variations will then have only the effect of slightly changing the sensitivity.

This null method of comparison is a very sensitive, practical and accurate means of measuring any small capacity changes, such as the capacity changes of a caliper due to varying thickness of thread passing through it. This means is uninfluenced by other external factors, since such other unbalancing agents would be equally effective on each of the balanced circuits, resulting in a zero net change in the detecting or indicating device.

Unbalancing of two tuned circuits due to changes in the caliper capacitance connected across one of them, or caused by changes in the angular position of a variometer used as a tuning means with a fixed condenser, or any other method of variation of the tuning of one of two mutually balanced circuits is included in the scope of the null method of comparison. Nevertheless, I shall in my preferred arrangements concern myself specifically with capacity changes. The detection by the null method includes in its scope the varying of a physical condition in accordance with the unbalancing factor, and comparing the said varying physical condition with a predetermined fixed physical condition.

Figure 10 shows a balanced arrangement consisting of two tuned circuits with substantially identical parameters, as in Figure 9, the electromotive forces being induced through the substantially equal mutual inductances $M_1$ and $M_2$, and condenser $C_2$ being replaced by the parallel combination of $C_2$ and compensating condenser $C_3$, which is arranged for being varied in capacitance by the motor 104. 102 is a device responsive to inequality of the currents $I_1$ and $I_2$, and to the sense of this inequality. 103 is a system of relays arranged to be controlled by 102 and to cause the motion of compensating condenser $C_3$ through the agency of the motor 104 in such a direction as to change its capacitance to correct the inequality of $I_1$ and $I_2$.

Various simple forms that may be taken by the device 102 will now be described. In Figure 13 the same two tuned circuits as shown in Figure 10 are employed. It will be remembered that for a constant frequency the voltage across an inductance is directly proportional to the current through it, so that inequality of the currents in the circuits will be manifested by inequality of the voltages across the inductances. Across $C_1$ is shunted a thermionic rectifier $D_1$ in series with resistor $R_1$. If $R_1$ is made sufficiently high in resistance, the shunting effect of $D_1$—$R_1$ will not materially increase the effective resistance of the tuned circuit. Since $D_1$ will only pass current in one direction, a pulsating direct current will flow in $R_1$ and the cathode of $D_1$ will be at an average direct current potential with respect to ground determined by the voltage across the first tuned circuit. A substantially identical circuit consisting of $D_2$ and $R_2$ is shunted around the second tuned circuit, the direct current potential of the cathode of $D_2$ being determined by the voltage across the circuit. $R_1$ and $R_2$ as well as $D_1$ and $D_2$ are substantially identical.

For equal voltages across the two tuned circuits the cathodes of $D_1$ and $D_2$ will be at the same potential and no current will flow through the galvanometer relay 121 connected between them. The inductors 119 and 120 are to keep alternating currents out of the galvanometer while the condensers 213 and 214 are to by-pass the alternating components of the rectified current. If the operating point is at $a$ of Figure 8, when $C_2$ is increased, $I_2$ increases, the voltage across the second tuned circuit increases, the potential of the cathode of $D_2$ rises, and current flows from it to that of $D_1$, causing the galvanometer relay 121 to deflect.

Another arrangement using diode rectifiers is shown in Figure 14. Here the connections to the two diodes are such as to pass direct current through the common branch in opposite directions so that the current flowing through the galvanometer relay 126 is the difference between the two rectified currents. Condensers 122 and 123 offer low impedance paths around the galvanometer relay to the alternating currents, which inductors 124 and 125 serve to keep out of the galvanometer.

Two identical thermocouples may be used to compare the currents, as in Figure 15, in which the arrangement of the thermocross type of thermocouple is shown. The heater of thermocouple 127 is connected into the first tuned circuit, while the heater of thermocouple 128 is connected into the second tuned circuit. The direct current leads are connected in series through galvanometer relay 129 and are so poled that the thermoelectric forces act in opposition. When the currents $I_1$ and $I_2$ are equal, no current will flow through the galvanometer relay. However, if one current is greater than the other, the galvanometer relay will deflect in a direction dependent upon which current is the greater.

A differential hot wire ammeter is also a satisfactory instrument for comparing the currents. A suitable design of such an instrument is shown in Figure 16. The resistance wires 130 and 131 are respectively connected in the first and second tuned circuits. At one end they are fastened to hinged plate 132 and kept under tension by a spring attached to regulating screw 133, and at the other end they are attached to the circumference of staff 134, which is pivoted in bearings 135 and 136. Electrical connections are made through the hair spring 140. Staff 134 carries arm 137 which touches either contact 138 or 139 when it moves out of its center position. Equal currents flowing through wires 130 and 131 will produce no motion of the arm 137, since the expansions of the wires will be equal and will be taken up by motion of the hinged plate 132. If, however, the currents are unequal, one wire will expand more than the other and cause the arm 37 to move to touch the contact on that side.

The saturation plate current of a diode is dependent upon the filament or heater element current. The alternating currents flowing in two tuned circuits could be used to heat the filaments or heater elements of two diodes, $D_1$ and $D_2$, as shown in Figure 17. The difference in their plate currents could be arranged to deflect the galvanometer relay G by use of the same bridge circuit as shown in Figure 2, 142 being the plate battery.

Figure 18 shows the dependence of the saturation plate current $I_{ps}$ of a diode D upon the filament current $I_f$. If the initial operating current is $I_{f0}$, it will be seen that a considerable amplification is attained, the slope of the tangent line $b$—$b$ being much greater than that of $o$—$a$. The amplification obtainable by this means could be used in conjunction with the tuned circuit method for capacitance comparison for increased sensitivity, as shown in Figure 17. It could also be used in a pair of untuned circuits as shown in Figure 19. Here the condensers $C_1$, $C_2$ and $C_3$ are connected in series with the respective diodes $D_1$ and $D_2$ across the electromotive force E, whose amplitude and frequency are so adjusted that the operating point of the diodes is at $a$ in Figure 18. The difference between the saturation plate currents could be arranged to deflect the galvanometer relay 143 through use of the same bridge circuit as shown in Figure 2, 144 being the plate battery.

Certain of the above-mentioned means of measuring the capacitance of the caliper and compensating condenser are preferable from the standpoint of ease of maintenance and ruggedness of instruments used. The methods shown in Figures 13 and 14 are thus desirable because aging and replacement of the diodes has a negligible effect upon the operation of the circuit, due to the high series resistance. The use of the differential hot wire ammeter shown in Figure 16 is also desirable in that it eliminates the use of vacuum tubes and the sensitive galvanometer relay.

With these preferred arrangements I am illustrating various specific methods of and means for detecting changes brought about by variations in the capacity of a condenser. It will be obvious to those skilled in the art that other methods may be devised to accomplish this result, and that the principle of my invention is to produce a varying physical condition in accordance with a varying capacitance, and to detect the difference between said varying physical condition and a predetermined fixed physical condition.

Figure 20:
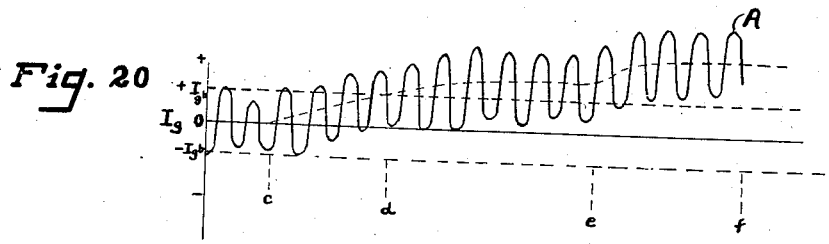
Figure 20 is a diagram illustrating the effect of rapid fluctuations of thread diameter upon the operation of the sensitive relay.

The time constant of the indicating and controlling means is of importance in affecting the sensitivity and accuracy of the instrument. This is illustrated in Figure 20. Curve A shows a curve of the current through the galvanometer relay coil 63 of Figure 2 plotted against time as thread is being run uniformly through the caliper jaws. Due to the unimportant short-length fluctuations, the current will oscillate about a mean, as shown from 0 to $c$, for which time the bridge is balanced. The current necessary to operate the relay is indicated by $I_{gb}$, and so long as the fluctuations in $I_g$ are within the limits of $+I_{gb}$ and $-I_{gb}$, the relay contacts will not close. From $c$ to $d$, however, the average thread diameter increases, so that the current swings are more on the positive side, and the relay contacts will close on each swing of the current outside the limits $+I_{gb}$ and $-I_{gb}$, although the average current is less than that required to operate the relay.

Due to the speed of the fluctuations, the current supply to the power relay coils 71 and 72 controlling the motor 22 of Figure 2 is never on for a sufficiently long time to operate the relays. This is likewise the case in the time interval $d$ to $e$, when the average current is greater than that required for operation, but the power relays are not operated. It is not until the interval $e$ to $f$, when the current fluctuations are wholly beyond the value $+I_{gb}$, that the current through the contact to the appropriate relay coil is not interrupted. The power relay then operates, causing the motor to move to correct the unbalance. However, the average current, that is, the average amount of unbalance necessary to cause correction of the unbalance is thus much greater than the amount normally required to operate the relay. The sensitivity of the galvanometer relay and thus the sensitivity and accuracy of the thread measuring device are therefore seen to be dependent upon the magnitude and rate of the thickness fluctuations. That this is undesirable is obvious. What is needed is a means for damping the rapid fluctuations before they actuate the galvanometer relay.

One method of damping the rapid fluctuations is the inclusion of an electrical low-pass filter in the leads to the galvanometer relay coil 149, as shown in Figure 21. This may comprise one or more sections of the form shown, consisting of series inductor 146 and shunt capacitors 147 and 148. Another and more compact means would be the insertion of a mechanical low-pass filter between the galvanometer relay armature and the contacts. This could take the form shown in Figure 22. Here 148 and 149 are the pole pieces and 150 the moving coil carrying the fork 151. Mass 155 has a high moment of inertia about its center of rotation 156, and carries an arm 154 by which it is coupled to the fork 152 through the compliant coupling consisting of springs 152 and 153. Contact arm 157 touches the contacts 158 or 159 when mass 155 is deflected from its normal position. Due to the high moment of inertia and the high compliance of the weak springs 152 and 153, rapid fluctuations in the position of the moving coil 150 will not cause appreciable motion of the contact arm 157, while any slow variation will do so.

Figures 22, 23:
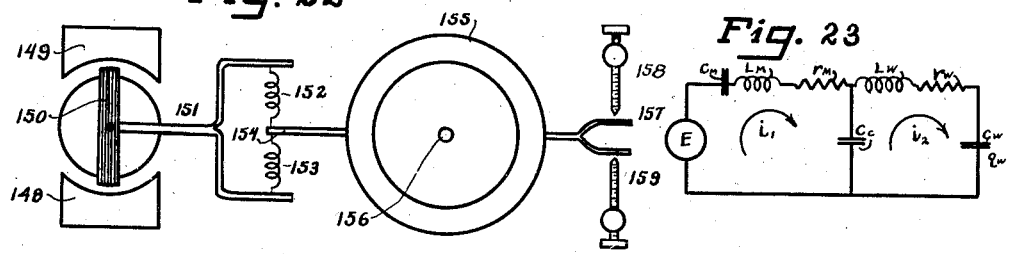
Figure 22 is a mechanical arrangement for dampening the effect of rapid fluctuations upon the sensitive relay.
Figure 23 is a diagram of the electrical analogue of the mechanical arrangement of Figure 22.

The operation of this system may perhaps be better understood by reference to the circuit of its electrical analogue shown in Figure 23. This has the form of a low-pass filter. Here $L_m$ and $r_m$ represent respectively the moment of inertia and the mechanical friction of the moving coil, $C_m$ the compliance of its hair springs, $C_c$ the compliance of the spring system 152 and 153, $L_w$ and $r_w$ respectively the moment of inertia and mechanical friction of the mass 155, and $C_w$ the restoring compliance acting on 155, in this case being zero. The velocities of 150 and 155 are represented respectively by $i_1$ and $i_2$, and $q_w$ the charge on $C_w$, is analogous to the displacement of 155. Various modifications of the several parts could be made while retaining the desired ability to prevent the relay contacts from being operated by the rapid fluctuations and to make them only respond to average variations. This same result is attained by means of the thermal inertia of the heated wires in the circuits and devices shown in Figures 15, 16, 17 and 19.

Figure 24:
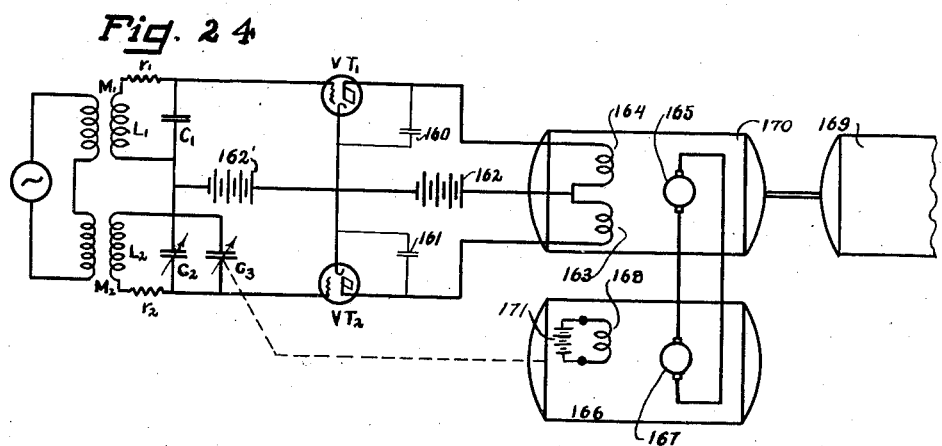
Figure 24 is an electrical circuit for a measuring device utilizing a continuous control of the compensating condenser.

In Figure 2 the control of the motor was by means of the relay system 24, which could only start the motor running at a constant speed in one direction or the other, or stop it. For some applications, particularly in recorder work, it would be preferable to have the motor controlled in such a way that its speed is greater, the greater the unbalance that it is to correct. This could be accomplished by using in place of the relay system a Ward-Leonard system of motor speed control, as shown in Figure 24. The tuned circuits are arranged in the same manner as those in Figure 2, the voltages across the circuits being respectively applied between the cathodes and the grids of the two vacuum tubes $VT_1$ and $VT_2$. The grid bias is furnished by battery 162' and the plate voltage by battery 162. Condensers 160 and 161 by-pass the alternating current components of the plate currents. The direct current components of the plate currents of the two vacuum tubes pass respectively through the opposed fields 163 and 164 of the direct current generator 170' driven by constant speed motor 169. The armature 165 of generator 170 is connected to the armature 167 of direct current motor 166 with field 168 separately excited through potential source 171', which is mechanically connected to move compensating condenser $C_3$. When the voltages across the two tuned circuits are equal, equal plate currents will pass through the two opposed field coils 164 and 165, and motor 166 will not revolve. If the current through one of the fields is increased due to increase in the voltage of the corresponding tuned circuit, the motor 166 will revolve in the proper direction to correct the unbalance, at a speed proportional to the amount of unbalance.

Figure 25:
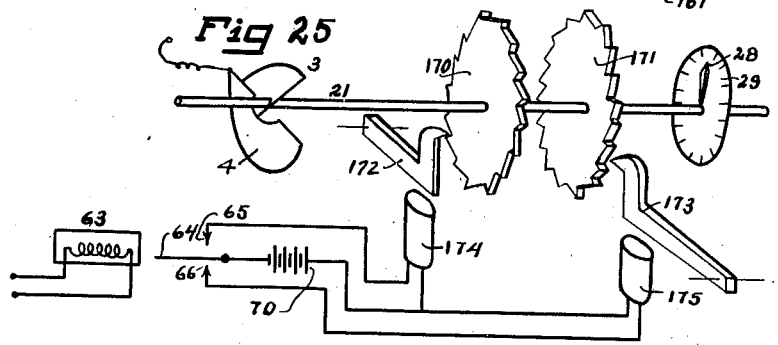
Figure 25 is an arrangement of the indicating part of a measuring device utilizing ratchet relays to control the position of the compensating condenser.

Various modifications of the relay controlled motor system shown in Figure 2 are also possible. One, shown in Figure 25, utilizes a relay controlled ratchet motor. 170 and 171 are ratchets arranged to turn the shaft 21 clockwise when 171 is engaged by armature 173 or counterclockwise when 170 is engaged by armature 172. Both armatures 172 and 173 are normally held disengaged from their ratchet wheels, and are respectively operated by the self-interrupting relays 174 and 175. The action of each of these relays is to give a continuous series of impulses to the armature, when energized by the battery 70 through the closing of one or the other of the galvanometer relay contacts 65 and 66 by the armature 64, as controlled by the current through the coil 63. Ratchets 170 and 171 may either be connected directly to the shaft 21, or through speed reduction gearing, and when moved by the armatures, serve to move the compensating condenser 3, 4 to restore the balanced condition of the circuits in 26 in Figure 2.

As stated before, the present methods of rating silk thread are tedious, wasteful and inaccurate. The quality of thread depends upon the amount of the deviations of its thickness from some constant quantity. The thread measuring device shown in Figure 1 may be arranged to give a continuous record of the separately integrated positive and negative deviations from any predetermined thickness.

Figure 26:
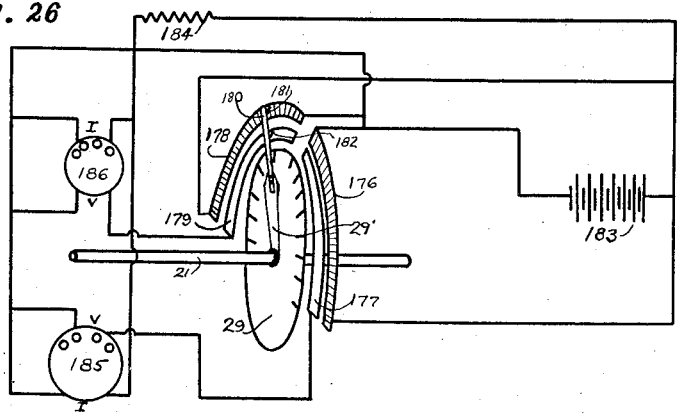
Figure 26 is an arrangement of the indicating part of a measuring device to separately integrate the first power of the positive and negative deviations from any predetermined thickness.

In Figure 26, 21 is the compensating condenser shaft, 29' is the pointer attached thereto, and 29 is the graduated scale over which the pointer 29' moves as in Figure 1. Pointer 29' carries an arm 180 on which are mounted two brushes 181 and 182, connected together and bearing respectively on resistance strip 178 and bar 179, or on resistance strip 176 and bar 177, depending on the position of the pointer 29'. The narrow opening between 176 and 178, and 177 and 179 may be adjusted to correspond with any desired division of the scale 29. For this purpose it is desirable to have the compensating condenser plate 3 so shaped that the scale 29 is graduated logarithmically, so that equal percentage deviations are represented by equal displacements of the pointer 29' no matter what the average thickness of the thread may be. The deflection of the pointer from its mid position with the brushes between the bars 177 and 179, and the resistance strips 176 and 178, is then proportional to the percentage deviation from the thickness corresponding to the center position.

Watt-hour meters 185 and 186 are the integrating devices. Their current coils are connected through resistance 184 to the battery 183 and their voltage coils respectively to the bars 179 and 177. Resistance 178 is connected across battery 183 and acts as a potentiometer, the voltage between the inside end and the brush 181 being applied through the other brush 182 and the bar 179 to the voltage coil of the watt-hour meter 186. Meter 185 is similarly connected. The reading of a watt-hour meter is proportional to the product of time, current and voltage. The current through the coils is constant, the voltage is proportional to the departure of pointer 28 from the chosen center position if the resistance strips 176 and 178 are uniform, and the time depends upon the length of thread run through if its speed is constant. Therefore the reading of each watt-hour meter will indicate the integral of the first power of the deviations, the positive and negative deviations being separately integrated and indicated.

Figure 27:
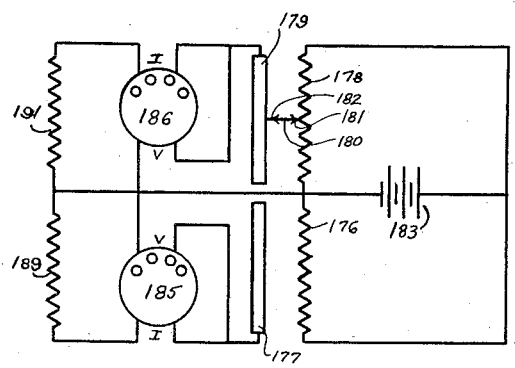
Figure 27 is an arrangement of the indicating part of a measuring device to separately integrate the square of the positive and negative deviations from any predetermined thickness.

Large deviations cause more serious differences in the appearance of the fabric than small ones, so it would be desirable to give more importance to the larger deviations. This would be accomplished by integrating a higher power of the deviation, such as the square. This could be accomplished with the apparatus of Figure 26 by proportioning the resistance strips 176 and 178 so that the resistance measured from the center is the desired function of the distance from the center. A uniform resistance strip could also be used to give an integration of the square of the deviations by use of the circuit shown in Figure 27, in which corresponding parts bear the same numerals as in Figure 26. The watt-hour meters 185 and 186 are connected to read the power taken respectively by the equal resistors 189 and 191. A voltage proportional to the deviation is applied to one or the other of these resistors by the brush 181. Since the power taken by a resistance is proportional to the square of the voltage applied to it, the watt-hour meters will integrate the square of the deviations.

Other methods of integration could be used, electrolytic, hydraulic, or mechanical, as, for example, the special integraph developed by the Carnegie Institution for separately integrating the positive and negative deviations of seismographic records.

As stated before, the scope of this invention is intended to include any means whereby the property of the material which it is desired to measure may be made to control the magnitude of an electrical quantity, where changes in the value of the electrical quantity may automatically be compensated by means involving a mechanical or electrical displacement which may be used for indication and control purposes.

Figure 28:
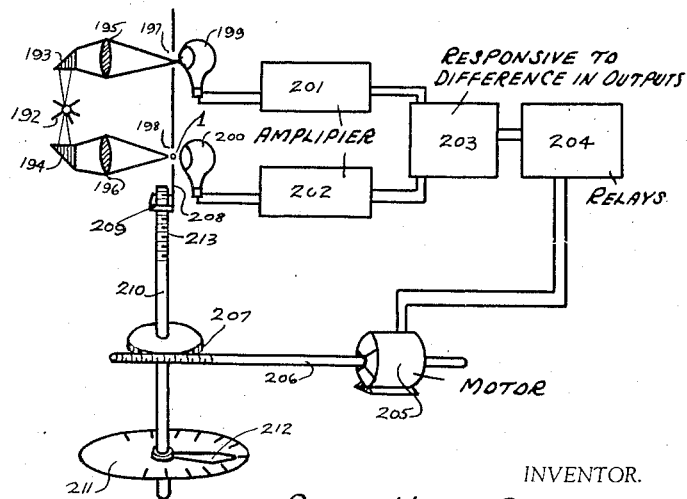
Figure 28 is an arrangement of a thread measuring device utilizing photoelectric cells.

As an example of an alternate means for measuring the diameter of a thread, an apparatus utilizing photoelectric cells is shown in Figure 28. Light from the common source 192 is reflected by the prisms 193 and 194 and focused respectively by the lenses 195 and 196 upon the slits 197 and 198. A quantity of light determined by the width of the slit 197 passes through it and falls upon the photoelectric cell 199, which controls the output current of amplifier 201. Similarly a quantity of light, determined by the diameter of the thread 1 passing through slit 198 and the width of the slit 198, falls upon photoelectric cell 200 which controls the output current of amplifier 202. Device 203 is responsive to the difference in magnitude and sense of the output currents of amplifiers 201 and 202, and controls the relay system 204 which controls the operation and direction of rotation of motor 205. This motor is arranged to turn shaft 206, which through speed reduction gearing 207, turns shaft 210 to which is attached pointer 212 moving over scale 211, and rotates screw 213 working in nut 209 attached to the movable jaw 208 of slit 198.

The photoelectric cells 199 and 200 and their respective amplifiers 201 and 202 are adjusted so that when substantially equal quantities of light pass through the slits 197 and 198, the output currents are substantially equal and device 203 does not cause relay system 204 to operate motor 205. If, however, the quantity of light passing through slit 198 becomes larger than that passing through slit 197, due to a thinner thread 1 passing by the slit 198, the output currents of the amplifiers 201 and 202 will differ, causing 203 through the relay system 204 to operate motor 205 to turn the screw 213 in such a direction that the movable jaw 208 moves to make the slit 198 narrower until the quantities of light passing through slits 197 and 198 are equal.

The thread 1 to be measured is placed or caused to run through slit 198, and the quantity of light passing through will thus depend upon the diameter of the thread. This is kept equal to the quantity passing through the slit 197 by the motion of the movable jaw 208. Since the position of the movable jaw 208 is determined by the angular position of screw 213, the position of the pointer 212 is an indication of the position of the movable jaw. Furthermore, since the position of the movable jaw is directly dependent upon the diameter of the thread, the position of pointer 212 upon the scale 211 is a measure and indication of the diameter of the thread.

It will be noted that variations in the strength of the light source 192 will have no effect upon the measurement, since the quantity of light passing through both slits will be affected equally and there thus will be no effect upon the condition of balance. An advantage of this apparatus is that it does not touch the thread in carrying out the measurement, and in that an average diameter of the thread over the length of the slit is measured.

Moreover, although my illustrations are applied specifically to the detection of the thickness of a thread, it would be obvious to those skilled in the art that my disclosure involves a novel principle of applying the null method of comparison to the detection of a variable physical condition. For purposes of explanation I have shown various specific methods of and means for the measurement of variations in the thickness of a thread to indicate, integrate or control thereby, it will be obvious that broadly my invention resides in the applications of the null method of comparison for detecting changes in the thickness of a thread or a sheet by causing respective changes in the capacity of a condenser to correspondingly vary a physical condition.

Therefore I do not intend to be limited except as set forth in the appended claims.

I claim:

1. In combination; a first tuned circuit; a second tuned circuit, said tuned circuits being normally tuned to the same frequency; means for applying to both tuned circuits a voltage of a predetermined frequency different than the frequency of said tuned circuits; means for varying the tuning of one of said circuits; a common output circuit for both of said tuned circuits including means for detecting said variations in tuning; means in said output circuit responsive to said detection for automatically re-tuning said first circuit to said predetermined value and means for measuring the amount of said last means necessary for retuning the said first circuit.

2. In combination; a first tuned circuit; a second tuned circuit, said circuits being tuned to the same frequency; means for applying a voltage of a predetermined frequency to said circuits; a detector tube connected to each of said tuned circuits; a common circuit connection for each of said detector tubes; an indicator; said indicator being connected to the output circuit of each of said detector tubes; means for varying the tuning of one of said circuits; means for producing a current proportional to the variation of said tuning of said one of said circuits with respect to the other of said circuits; and means for operating said indicator in accordance with said current whereby in response to the variations in the tuning of one circuit, a corresponding indication is given on said indicator.

OSCAR HUGO SCHUCK.